US010547663B2

(12) United States Patent
DeLuca et al.

(10) Patent No.: US 10,547,663 B2
(45) Date of Patent: *Jan. 28, 2020

(54) SYSTEM AND METHOD FOR WEB CONFERENCING PRESENTATION PRE-STAGING

(71) Applicant: International Business Machines Corporation, Armonk, NY (US)

(72) Inventors: Lisa Seacat DeLuca, Baltimore, MD (US); Shelbee D. Eigenbrode, Thornton, CO (US); Dana L. Price, Surf City, NC (US); Aaron J. Quirk, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,208

(22) Filed: Jan. 9, 2019

(65) Prior Publication Data

US 2019/0158565 A1    May 23, 2019

Related U.S. Application Data

(63) Continuation of application No. 15/819,483, filed on Nov. 21, 2017, now Pat. No. 10,237,324.

(51) Int. Cl.
| | |
|---|---|
| *H04N 7/14* | (2006.01) |
| *H04L 29/06* | (2006.01) |
| *H04N 7/15* | (2006.01) |
| *G06F 9/451* | (2018.01) |

(52) U.S. Cl.
CPC .............. *H04L 65/80* (2013.01); *G06F 9/452* (2018.02); *H04L 65/403* (2013.01); *H04N 7/15* (2013.01)

(58) Field of Classification Search
CPC .... G01S 5/0072; G06F 17/3028; G06F 9/452; H04L 12/18; H04L 63/102; H04L 63/105;
(Continued)

(56) References Cited

U.S. PATENT DOCUMENTS

| | | |
|---|---|---|
| 6,728,753 B1 | 4/2004 | Parasnis et al. |
| 7,131,068 B2 | 10/2006 | O'Neal et al. |

(Continued)

OTHER PUBLICATIONS

Saba Centra 7.7 SP1, "Using Breakout Rooms", Jun. 24, 2011, 18 pgs.

(Continued)

*Primary Examiner* — Khai N. Nguyen
(74) *Attorney, Agent, or Firm* — Michael P. O'Keefe; Maxine L. Barasch; Keohane & D'Alessandro PLLC

(57) ABSTRACT

Disclosed embodiments provide a system and method for performing a web conferencing presentation pre-staging. In a web conference with multiple participants and various presenters, each presenter is able to view a live presentation that is currently being presented to the participants, as well as view her own presentation in a pre-staged presentation mode. The test presentation mode allows a presenter to see how the presentation will appear to others, and provides an opportunity to test features such as audio, animation, time delay, lighting, and other important factors. When the current live presentation ends, the presentation that is in test presentation mode is switched to live presentation mode for viewing by the participants of the web conference.

20 Claims, 11 Drawing Sheets

(58) Field of Classification Search
CPC ............... H04L 65/403; H04L 65/4038; H04L 65/4084; H04L 65/4092; H04L 65/602; H04L 65/604; H04L 65/607; H04L 12/1813; H04L 12/581; H04L 47/78; H04L 47/80; H04L 51/04; H04L 63/10; H04L 63/104; H04L 63/107; H04L 65/1053; H04L 65/80; H04L 67/18; H04L 67/24; H04M 1/72572; H04M 2201/40; H04M 2250/52; H04M 3/4936; H04M 3/5191; H04M 1/274575; H04M 1/72586; H04M 2203/60; H04M 2203/2072; H04M 2203/2094; H04M 2203/5054; H04M 2242/30; H04M 2250/62; H04M 3/42; H04M 3/4234; H04M 3/42221; H04M 3/42246; H04M 3/42348; H04M 3/42357; H04M 3/42374; H04M 3/4931; H04M 3/56; H04M 3/562; H04M 3/563; H04M 3/564; H04M 3/565; H04M 3/566; H04M 3/567; H04M 3/568; H04M 7/006; H04M 7/15; H04M 7/146; H04M 7/1235; H04N 2007/145; H04N 5/272; H04N 7/14; H04N 7/141; H04N 7/142; H04N 7/144; H04N 7/147; H04N 7/148; H04N 7/15; H04N 7/152; H04N 7/155; H04N 7/157; H04N 7/23206; H04W 4/18; H04W 4/185; H04W 12/08; H04W 4/02; H04W 4/06; H04W 4/08
USPC ......... 348/14.01, 14.02, 14.03, 14.04, 14.05, 348/14.06, 14.07, 14.08, 14.09, 14.1, 348/14.11, 14.12, 14.13, 14.14, 15.15, 348/14.16; 382/375; 379/265.03; 455/414.1, 566; 704/270
See application file for complete search history.

(56) References Cited

U.S. PATENT DOCUMENTS

| | | | |
|---|---|---|---|
| 7,714,802 B2 | 5/2010 | Hurley et al. | |
| 8,130,256 B2 | 3/2012 | Trachtenberg et al. | |
| 8,918,722 B2 | 12/2014 | Sitrick et al. | |
| 8,924,243 B2 | 12/2014 | Bentley et al. | |
| 9,277,269 B2 | 3/2016 | Zarom | |
| 9,383,893 B1 | 7/2016 | Ogdon et al. | |
| 9,399,172 B2* | 7/2016 | Haberman | A63F 13/355 |
| 9,973,792 B1* | 5/2018 | Delachanal | H04N 21/4316 |
| 2003/0122860 A1* | 7/2003 | Ino | G11B 27/031 715/716 |
| 2004/0103150 A1* | 5/2004 | Ogdon | H04L 12/1813 709/205 |
| 2009/0018899 A1* | 1/2009 | Ogushi | G06Q 10/00 705/7.13 |
| 2010/0037151 A1 | 2/2010 | Ackerman et al. | |
| 2013/0019150 A1 | 1/2013 | Zarom | |
| 2014/0213227 A1* | 7/2014 | Rao | H04W 4/21 455/414.3 |
| 2014/0281011 A1 | 9/2014 | Zarom | |
| 2015/0092116 A1* | 4/2015 | McCullough | H04N 7/147 348/838 |
| 2015/0100503 A1* | 4/2015 | Lobo | G06Q 10/103 705/301 |
| 2015/0200979 A1 | 7/2015 | Huang et al. | |
| 2015/0263905 A1 | 9/2015 | Beel et al. | |
| 2016/0072861 A1* | 3/2016 | Woolsey | H04L 51/046 455/414.1 |
| 2016/0094354 A1* | 3/2016 | Zhao | H04L 12/1822 709/205 |
| 2016/0104122 A1* | 4/2016 | Mande | G06Q 10/1095 705/7.19 |

OTHER PUBLICATIONS

"Go to Meeting", https://support.citrixonline.com/en_US/Meeting/all_files/G2M050001, Copyright 2017 LogMain Inc., 3 pgs.

SMART Bridgit 4.2, "User's Guide", Copyright 2010 SMART Technologies ULC, 33 pgs.

Lamorte et al., "Skype for Business (Lync)", http://sphweb.bumc.bu.edu/ottt/mph-modules/HowTo/SkypeBusiness/SkypeBusiness_print.html, Sep. 21, 2017, 38 pgs.

Khai N. Nguyen, USPTO Office Action, U.S. Appl. No. 15/819,483, Notification Date Jun. 27, 2018, 10 pages.

Khai N. Nguyen, USPTO Notice of Allowance and Fee(s) Due, U.S. Appl. No. 15/819,483, dated Oct. 29, 2018, 5 pages.

* cited by examiner

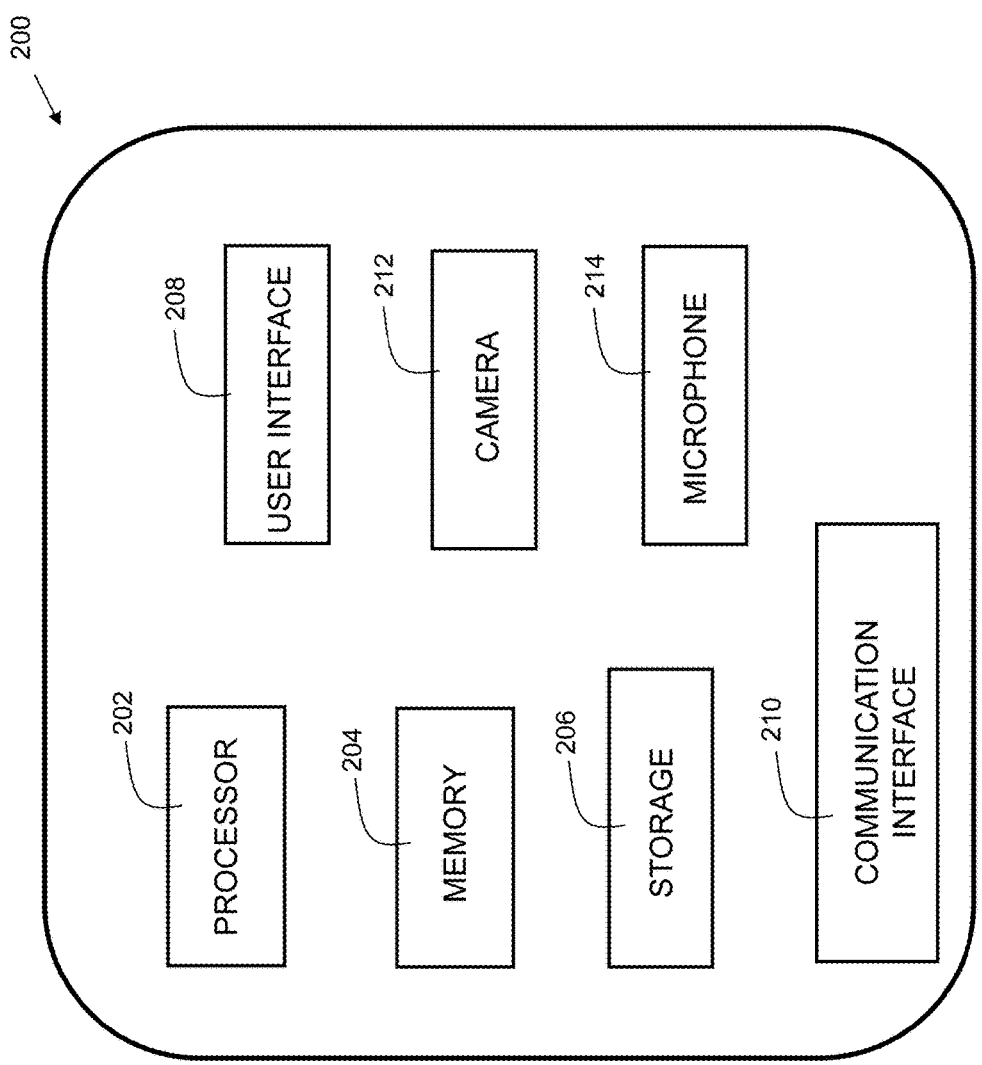

SYSTEM AND METHOD FOR WEB CONFERENCING PRESENTATION PRE-STAGING

CROSS-REFERENCE TO RELATED APPLICATIONS

The present patent document is a continuation of U.S. patent application Ser. No. 15/819,483, filed Nov. 21, 2017, entitled "SYSTEM AND METHOD FOR WEB CONFERENCING PRESENTATION PRE-STAGING", the disclosure of which is incorporated herein by reference.

FIELD OF THE INVENTION

Embodiments of the present invention relate to web conferencing and, more particularly, a system and method for web conferencing presentation testing.

BACKGROUND

Today, it is commonplace for conferences to be held in virtual settings via computers, rather than in person. Web conferencing allows people from anywhere on the globe where they have a network connection to communicate with one another, share information and ideas, and collaborate on projects and documents. It is important for these conferences to run smoothly without interruption or system failures such that the time of participants is not wasted. Technical issues with web conferencing systems decrease productivity and cause effort to be wasted on trying to resolve the issue instead of being able to focus on the task for which the web conference was intended. Accordingly, there exists a need for improvements in web conferencing technology.

SUMMARY

In one aspect, there is included a computer implemented method for performing a web conferencing presentation pre-staging, comprising: creating a web conference amongst a plurality of participants with a first presentation corresponding to a first participant in a live presentation mode; creating a pre-staged presentation for a second presentation corresponding to a second participant in a pre-staged presentation mode; displaying on an electronic display system associated with the second participant, the first presentation in the live presentation mode simultaneously with the second presentation in the pre-staged presentation mode; and transitioning the second presentation to the live presentation mode upon termination of the first presentation.

In another aspect, there is provided an electronic communication device comprising: a processor; a memory coupled to the processor, the memory containing instructions, that when executed by the processor, perform the steps of: creating a web conference amongst a plurality of participants with a first presentation corresponding to a first participant in a live presentation mode; creating a pre-staged presentation for a second presentation corresponding to a second participant in a pre-staged presentation mode; displaying on an electronic display system associated with the second participant, the first presentation in the live presentation mode simultaneously with the second presentation in the pre-staged presentation mode; and transitioning the second presentation to the live presentation mode upon termination of the first presentation.

In another aspect, there is provided a computer program product for performing a web conferencing presentation pre-staging, for an electronic computing device comprising a computer readable storage medium having program instructions embodied therewith, the program instructions executable by a processor to cause the electronic computing device to: create a web conference amongst a plurality of participants with a first presentation corresponding to a first participant in a live presentation mode; create a pre-staged presentation for a second presentation corresponding to a second participant in a pre-staged presentation mode; display on an electronic display system associated with the second participant, the first presentation in the live presentation mode simultaneously with the second presentation in the pre-staged presentation mode; and transition the second presentation to the live presentation mode upon termination of the first presentation.

BRIEF DESCRIPTION OF THE DRAWINGS

Features of the disclosed embodiments will be more readily understood from the following detailed description of the various aspects of the invention taken in conjunction with the accompanying drawings.

FIG. 2 shows a client device in accordance with embodiments of the present invention.

Figure 1A:
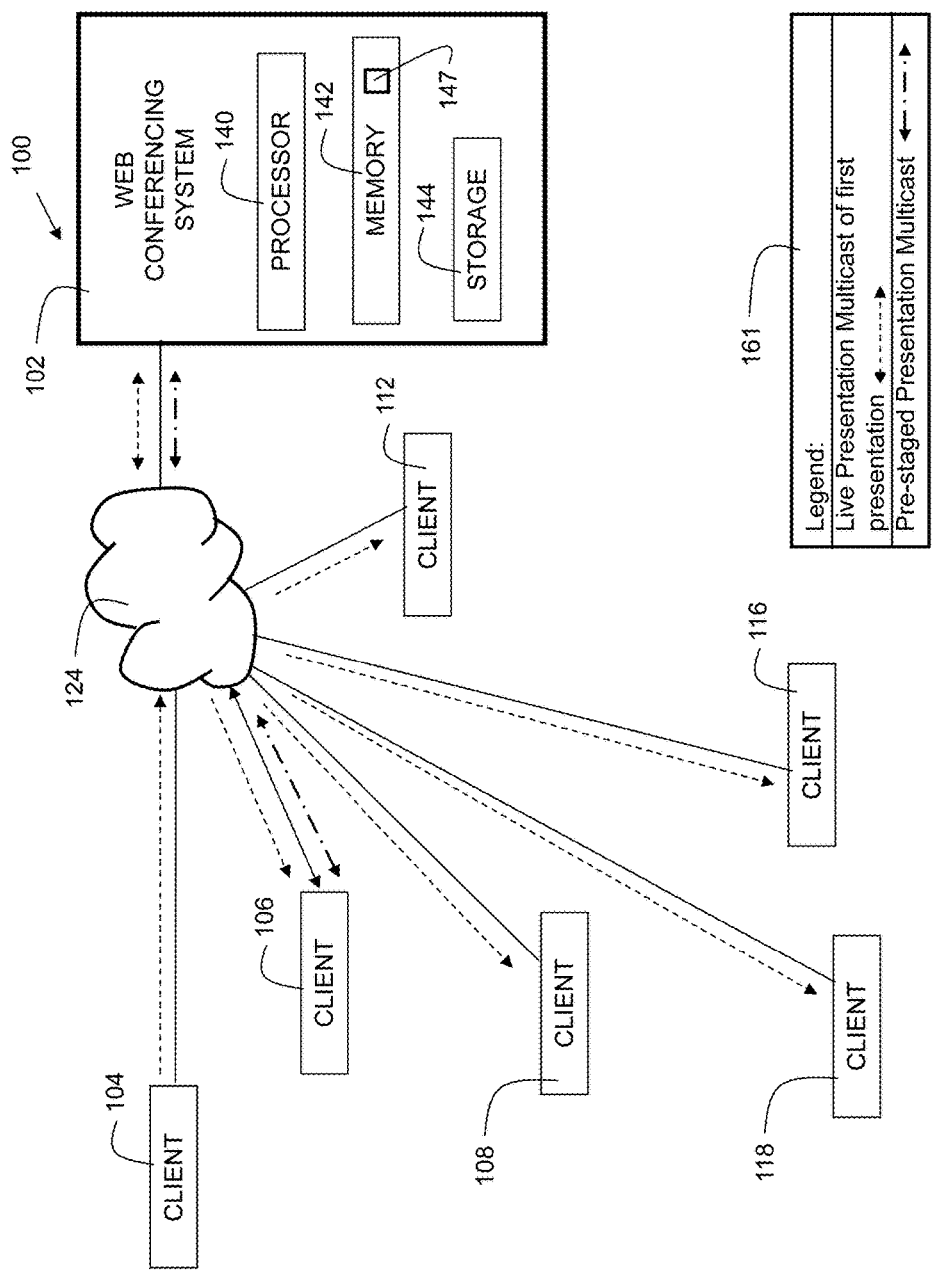
FIGS. 1A and 1B show a diagram of a system in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide a system and method for performing a web conferencing presentation pre-staging. In a web conference with multiple participants and various presenters, each presenter is able to view a live presentation that is currently being presented to the participants, as well as view her own presentation in a test presentation mode. The test presentation mode allows a presenter to see how the presentation will appear to others, and provides an opportunity to test features such as audio, animation, time delay, lighting, and other important factors. When the current live presentation ends, the presentation that is in test presentation mode is switched to live presentation mode for viewing by the participants of the web conference. In this way, the handoff between presenters within a web conference is smoother and more efficient. Presenters have an opportunity to identify and fix problems prior to moving their presentations into live presentation mode. This reduces disruptions due to technical issues and makes for a more productive web conference. Note that the "live presentation mode" refers to a presentation that is currently being transmitted to the participants of the web conference. The presentation itself may not necessarily be live, but may instead be a prerecorded presentation that is being presented to the participants as the current (live) presentation.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, and/or elements.

Figure 1B:
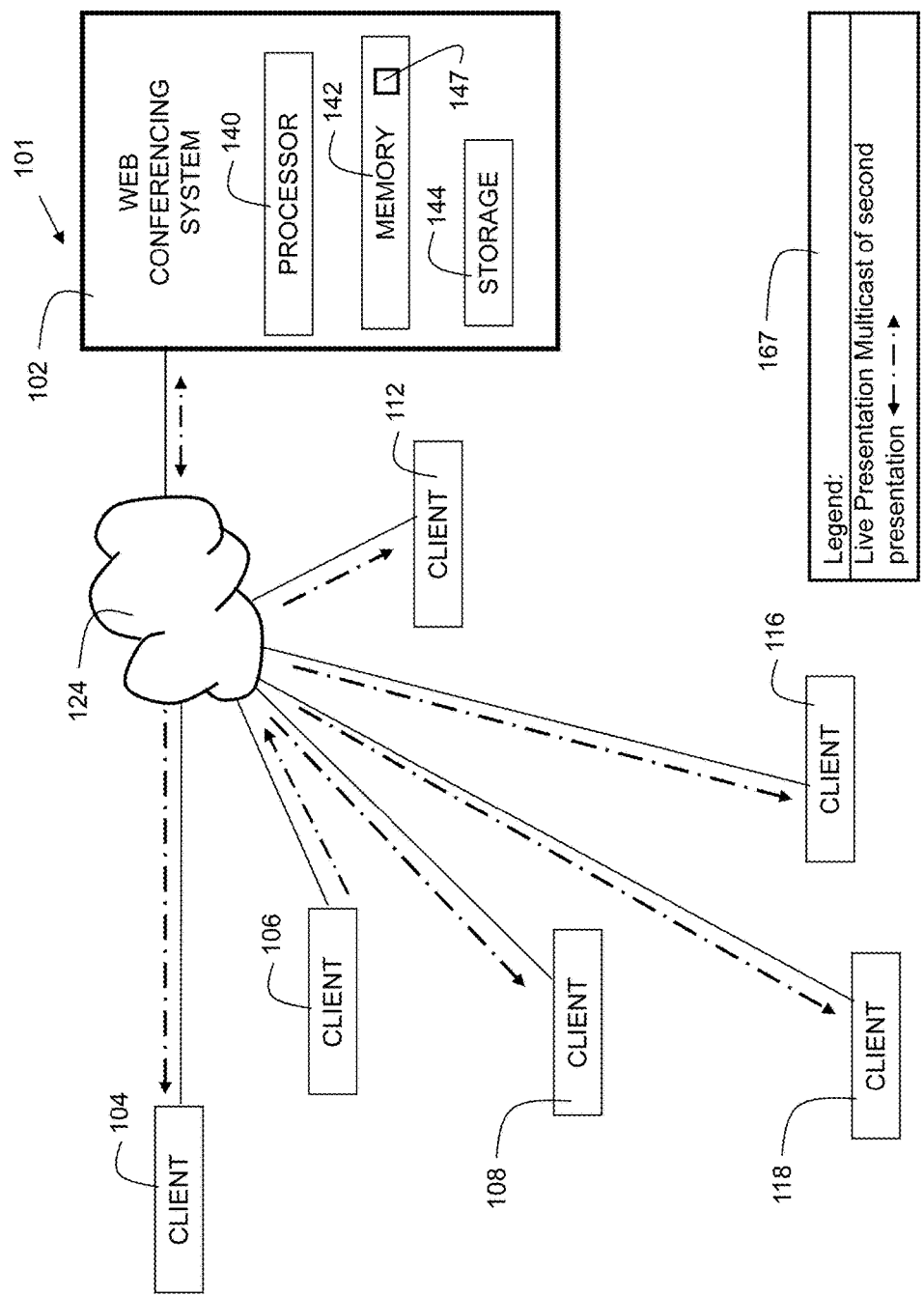

FIGS. 1A and 1B each show a diagram of an environment in accordance with embodiments of the present invention. Web conferencing system server 102 is shown as a simplified diagram of modules. System server 102 is an electronic computing device. System server 102 includes a processor 140, which is coupled to a memory 142. Memory 142 may include dynamic random access memory (DRAM), static random access memory (SRAM), magnetic storage, and/or a read only memory such as flash, EEPROM, optical storage, or other suitable memory. In some embodiments, the memory 142 may not be a transitory signal per se. Memory 142 includes instructions 147, which when executed by the processor, implement steps of the present invention. In embodiments, system server 102 may have multiple processors 140, and/or multiple cores per processor. System server 102 may further include storage 144. In embodiments, storage 144 may include one or more magnetic storage devices such as hard disk drives (HDDs). Storage 144 may include one or more solid state drives (SSDs). Any other storage device may be included instead of, or in addition to, those disclosed herein. Clients 104, 106, 108, 112, 116, and 118 are in communication with system 102 via network 124. Network 124 may be the Internet, a local area network (LAN), wide area network (WAN), or other suitable network.

FIG. 1A shows diagram 100, in which client 104 is transmitting a live presentation. The live presentation data is transmitted from client 104 to the web conferencing system server 102. Web conferencing system server 102 transmits the data to clients 106, 108, 116, 112, and 118, which receive the live presentation. Client 106 is transmitting a pre-staged presentation to the web conferencing system server 102, and the data is returned only to client 106 currently and temporarily. The data is transmitted back to client 106, so client 106 can display to the user what the presentation would currently look like if transmitted live to others. It is transmitted to client 106 via the same process as it would if transmitted live to others, so that the visual rendering and audio can be evaluated for live transmission. That is, it would use any suitable network protocols now known or hereafter developed. This allows the user to catch any errors prior to going live. Note that "live", for purposes herein, refers to a real-time current display. At a future point, client 106 begins to present the presentation live, which is the subject of FIG. 1B. The flow of information between the clients and the web conferencing system is indicated by the arrows depicted in legend 161.

FIG. 1B shows diagram 101, in which a transition has been made from transmitting live from client 104 to transmitting live from client 106. The live presentation data is transmitted from client 106 to the web conferencing system server 102. Web conferencing system server 102 transmits the data to clients 104, 108, 116, 112, and 118, which receive the live presentation. The flow of information between the clients and the web conferencing system is indicated by the arrows depicted in legend 167.

FIG. 2 shows a client device in accordance with embodiments of the present invention. Device 200 is shown as a simplified diagram of modules. Device 200 is an electronic computing device. Device 200 includes a processor 202, which is coupled to a memory 204. Memory 204 may include dynamic random access memory (DRAM), static random access memory (SRAM), magnetic storage, and/or a read only memory such as flash, EEPROM, optical storage, or other suitable memory. In some embodiments, the memory 204 may not be a transitory signal per se. Memory 204 includes instructions, which when executed by the processor, implement steps of the present invention. In embodiments, device 200 may have multiple processors 202, and/or multiple cores per processor.

Device 200 may further include storage 206. In embodiments, storage 206 may include one or more magnetic storage devices such as hard disk drives (HDDs). Storage 206 may include one or more solid state drives (SSDs). Any other storage device may be included instead of, or in addition to, those disclosed herein.

Device 200 further includes a user interface 208. In some embodiments, the user interface may include a display system, which may include one or more displays, examples of which include a liquid crystal display (LCD), a plasma display, a cathode ray tube (CRT) display, a light emitting diode (LED) display, an organic LED (OLED) display, or other suitable display technology. The user interface 208 may include a keyboard, mouse, and/or a touch screen, incorporating a capacitive or resistive touch screen in some embodiments.

The device 200 further includes a communication interface 210. In some embodiments, the communication interface 210 may include a wireless communication interface that includes modulators, demodulators, and antennas for a variety of wireless protocols including, but not limited to, Bluetooth™, Wi-Fi, and/or cellular communication protocols for communication over a computer network. Any communication interface, now known or hereafter developed, may be substituted. The device 200 further includes a camera (i.e., a webcam) 212 and a microphone 214.

Figure 3:
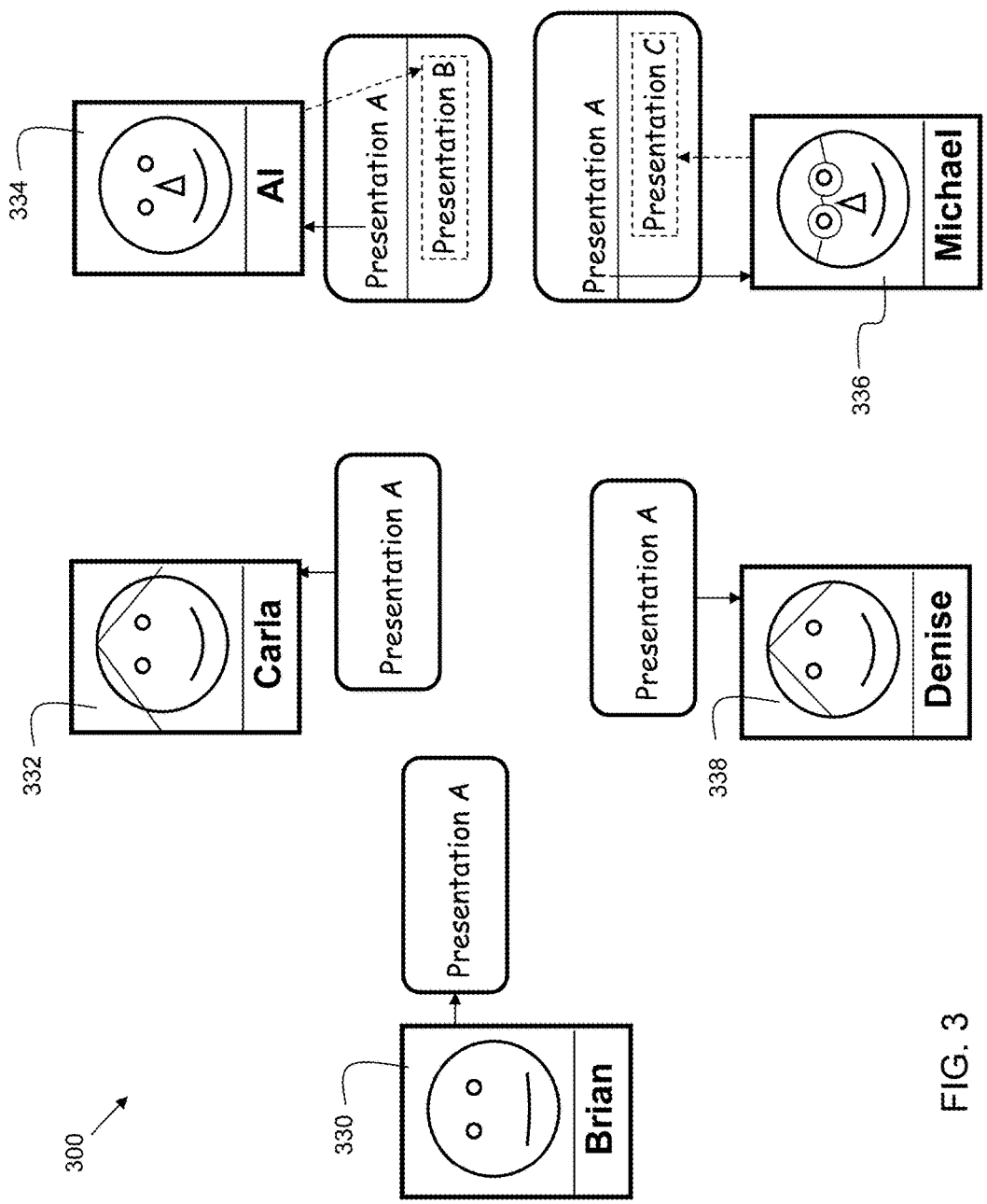
FIG. 3 illustrates an example of a test presentation mode in a web conference.

FIG. 3 illustrates an illustration 300 of test presentation mode in a web conference. Five users are shown. Brian 330, Carla 332, and Denise 338 are shown receiving live presentation A. Al 334 is shown receiving live presentation A, and transmitting a pre-staged presentation B simultaneously. Michael 336 is shown receiving live presentation A, and transmitting a pre-staged presentation C simultaneously. As shown, more than one user can be transmitting a pre-staged presentation at the same time while each also receiving the currently-transmitted live presentation.

Figure 4:
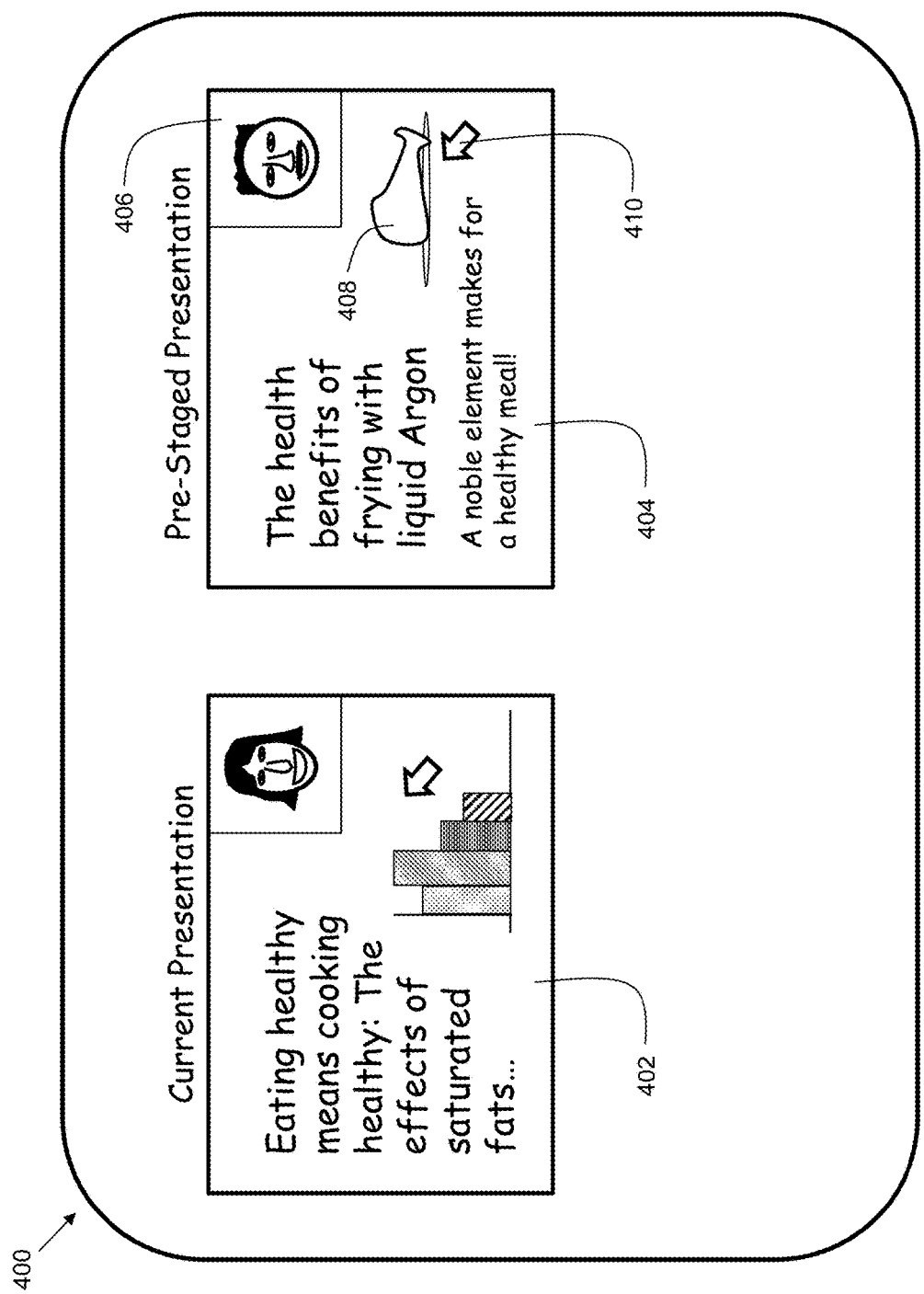
FIG. 4 shows an example of a test presentation mode display.

FIG. 4 shows an example of a pre-staged presentation mode display 400. This is the display of a client associated with a user (i.e., the "second user") who is receiving a live presentation (from the "first user" at a first client), while preparing another pre-staged presentation for transmission sometime after the current live presentation. Display window 402 shows the data of the current live presentation. It is received at a client device from system 102 (FIG. 1). Currently, a slide is being shown that says "Eating healthy means cooking healthy: The effects of saturated fats . . . ". A bar chart graphical element is shown. The current speaker is shown in a video window at 403. Display window 404 shows the data of the pre-staged presentation. A slide is being staged which shows "The health benefits of frying with liquid Argon". At 406, there is shown the live feed from the (on-deck presenter) user's webcam (currently showing the user's face). At 408, there is shown animation or graphical elements. At 410, there is shown a representation of a pointer device (e.g., cursor).

Figure 5:
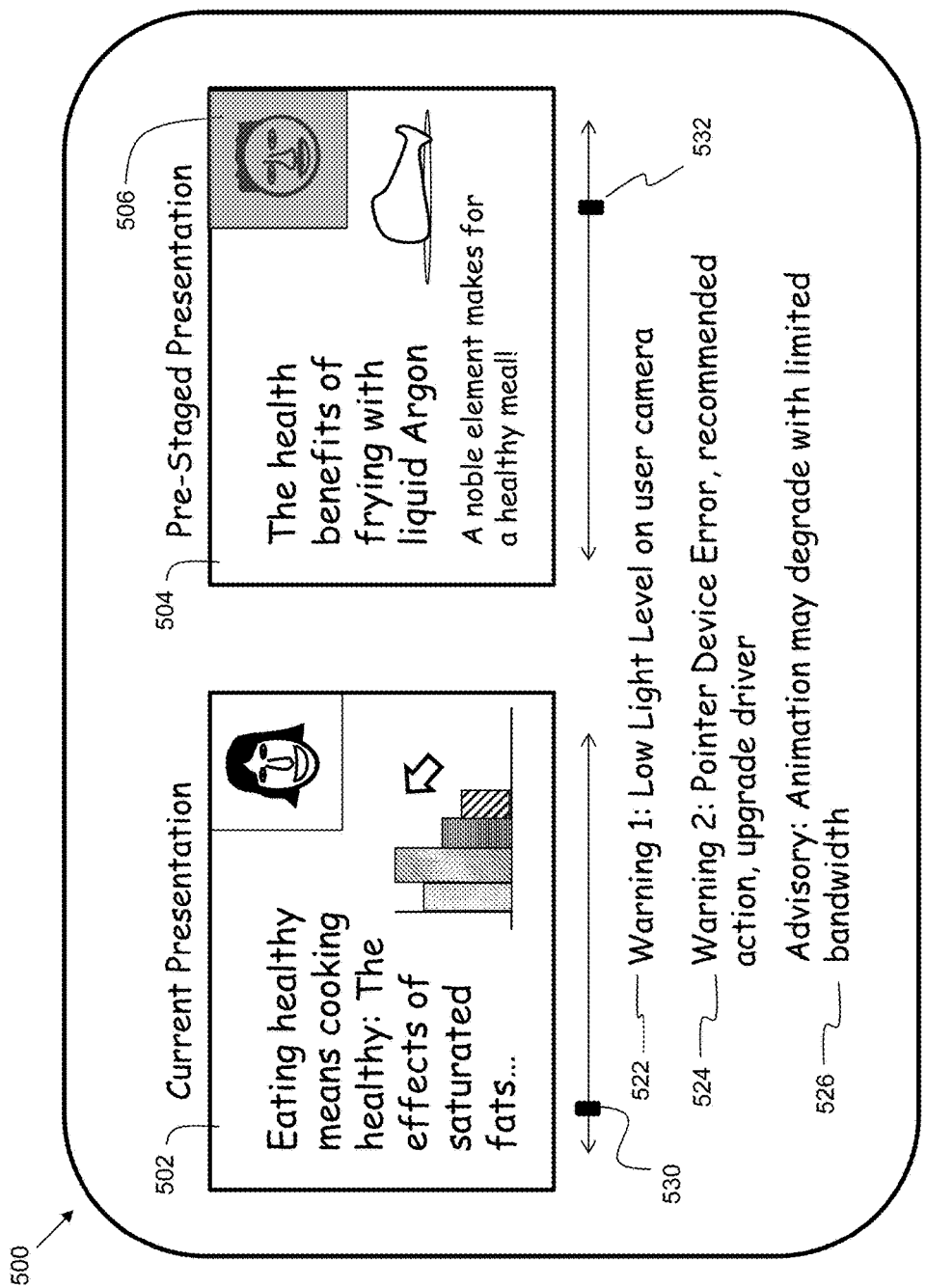
FIG. 5 shows exemplary diagnostic information provided by embodiments of the present invention.

FIG. 5 shows exemplary diagnostic information screen 500 provided by embodiments of the present invention. System 102 can execute one or more tests on a pre-staged presentation to determine whether the presentation is suitable to eventually go live. For example, in some embodiments, the diagnostic check includes a lighting check. For example, a contrast analysis may be executed to determine whether the light is within an acceptable range, or whether more or less is needed. A light placement recommendation may also be included to suggest to the user an optimal location for the light source to be situated in relation to the lens of the presenter's webcam. A mic-check may also be executed to check the clarity and volume of the presenter's microphone. In embodiments, more, fewer, or other tests may be included.

Embodiments include generating warnings and/or advisories to indicate potential problems and/or remedies for a presentation that is currently in pre-staged presentation mode. As shown, the webcam feed at 506 is dark, and therefore difficult to see. In response, at 522, there is shown an example of a warning: Low Light Level on user camera. This gives the presenter the opportunity to correct the issue before going live. Another warning is shown at 524, which says: Pointer Device Error recommended action, upgrade driver. As shown, the pointer device appears to be missing from display window 504. In embodiments, recommendations for improvements may also be provided. In the example, along with the warning about the pointer device at 524, it is recommended that the corresponding driver is upgraded. In embodiments, advisories may also be provided. In the example, at 526, it is advised that animation may degrade with limited bandwidth. In some embodiments, audio controls may be provided to allow a user to raise or lower the volume on the live presentation in window 502 and pre-staged presentation at window 504 as needed. In the embodiment shown in FIG. 5, a user can test sound him/herself by lowering the sound or muting the sound of the current live presentation using slide control 530 and raising the sound of the pre-staged presentation using control 532, so that they do not interfere with one another. It should be recognized that another mechanism can be substituted for the slide control within the scope of the present invention.

Figure 6:
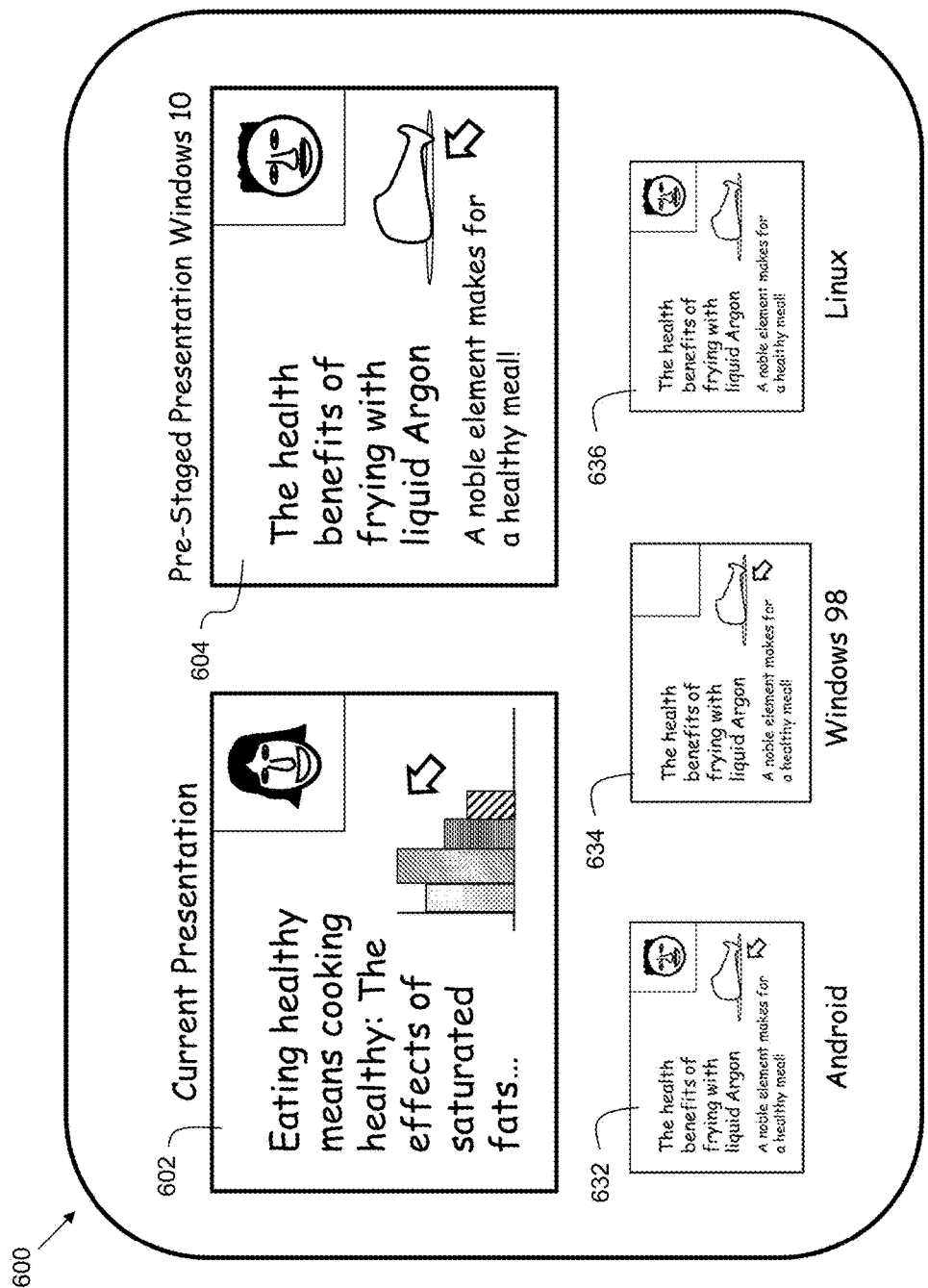
FIG. 6 shows an example of a test presentation mode on virtual machines.

FIG. 6 shows an example of a pre-staged presentation mode on virtual machines. Embodiments include creating a plurality of virtual machines at system 102 (FIG. 1), and rendering the second presentation in the pre-staged presentation mode on each of the virtual machines or emulators at the client of the second user on display system 600. The virtual machines each emulate a physical computer system. They provide functionality to execute operating systems, hardware, software, and functionality of a computer. Each of the plurality of virtual machines may execute a particular operating system. The operating systems may either be different systems, a different version of the same system, or a combination thereof. Each of the virtual machines executes the pre-staged presentation so as to show the user what the presentation will look like on such a machine "in real life" after going live.

In the example, the display system 600 shows window portion 602 displaying the current live presentation. The display 604 shows the pre-staged version in Windows 10, the operating system of the user's client device. In addition, three virtual machines are provided—one which runs on Android at 632; one that runs Windows 98 at 634, and one that runs Linux at 636. In the example, on the main pre-staged presentation window 604, everything appears to be displayed correctly. On VM 632, everything looks good, as well. On VM 634, however, the user's live feed from a webcam is blank, or missing. On VM 636, the pointer device is missing. The user is able to see such, so as to make changes needed for the presentation to display correctly on a variety of operating systems prior to going live. In some embodiments, system 102 detects the problems, and issues warnings and/or executes software to correct the errors where possible. In embodiments, display system 600 may be implemented with multiple monitors/displays. In such embodiments, the live presentation may be rendered on a first monitor while the pre-staged presentation is rendered on a second monitor.

Figure 7:
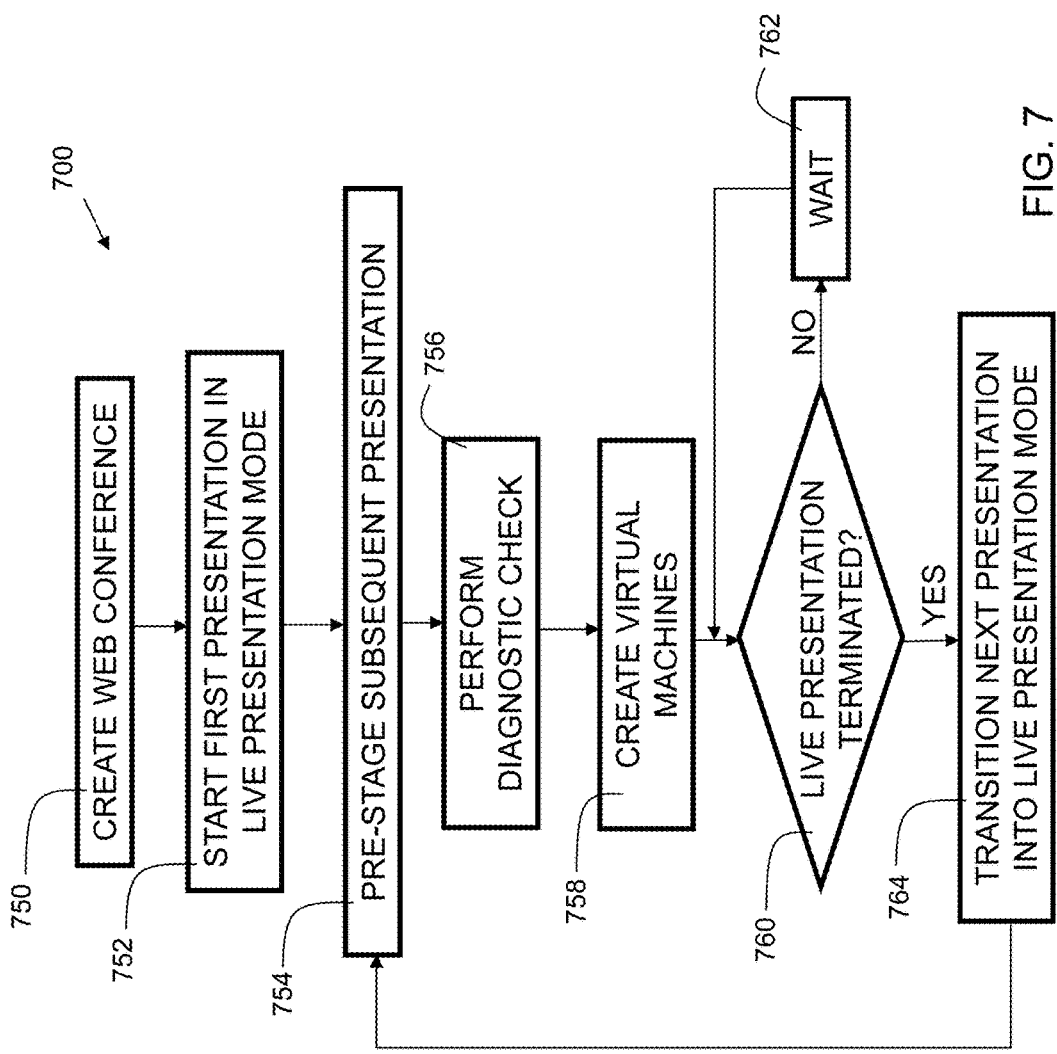
FIG. 7 is a flowchart indicating process steps for embodiments of the present invention.

FIG. 7 is a flowchart 700 indicating process steps for embodiments of the present invention. At 750, a web conference is created amongst a plurality of participants with a first presentation corresponding to a first participant in a live presentation mode. At 752, a first presentation is started in live presentation mode. At 754, a second (subsequent) presentation corresponding to a second participant is staged in a pre-staged mode. The first presentation, in the live presentation mode, is displayed simultaneously with the second presentation, in the pre-staged presentation mode, on an electronic display system associated with the second participant. At 756, at least one diagnostic test is performed. At 758, virtual machines are created. At 760, it is determined whether the live presentation is terminated. If not, at 762, wait, and return to 760. If yes, at 764, transition the second presentation into live presentation mode. In some embodiments, if there are three or more presentations, a queue of the live and pre-staged presentations may be set up to make the transitions from one to the next.

In some embodiments, the diagnostic check may include an audio check. In some embodiments, the audio check may be performed by system 102 (FIG. 1). This may include a channel check, where it is determined whether the sound input and output are set to proper channels. If they are not, the sound may not be heard when the presentation goes live. It may include a volume check to determine that the sound is at the proper volume, and not too high or too low. In some embodiments, the diagnostic check may include an echo check to determine whether the sound has an unwanted echo. If so, it may troubleshoot to determine the source of the echo. In some embodiments, the diagnostic check may include a mic placement check and recommendation. It may determine whether the microphone is set up in an optimal position. For example, if the system 102 determines the mic is sensing a user's voice from the left, it may recommend that the user move the mic to a located where instead the user can speak directly into it (centered). The second user can test sound him/herself by lowering the sound or muting the sound of the current live presentation using slide control 530 (FIG. 5), and raising the sound of the pre-staged presentation using control 532 (FIG. 5), so that they do not interfere with one another. It should be recognized that another mechanism can be substituted for the slide control within the scope of the present invention.

In some embodiments, the diagnostic check may include a lighting check. In some embodiments, the lighting check may be performed by system 102 (FIG. 1). The amount, brightness, source (i.e., artificial vs. natural sun), and placement of the light may be evaluated. The contrast of objects in relation to the light may be evaluated. For example, it may be determined whether the light source is set up in an optimal position. For example, if it is determined that the camera is facing directly into the light, it may be recommended that the light source or camera angle be moved such that the light source is instead behind the camera to soften glare.

In some embodiments, the diagnostic check includes a missing elements check. In some embodiments, the missing elements check may be performed by system 102 (FIG. 1). The check may be for a missing cursor, pointing device, etc. Embodiments may perform a computer-implemented comparison of the local copy (on the user's client) to the rendering that comes back through the system 102 (FIG. 1). If one or more elements in the local copy are missing from the returned copy, then an error is issued.

In some embodiments, the diagnostic check includes a quality of service (QoS) elements check. In some embodiments, the QoS elements check may be performed by system 102 (FIG. 1). In some embodiments, the diagnostic check may include a network degradation test. In some embodiments, the diagnostic check may include a lag test to determine if any latency present is too high above a predetermined threshold of acceptability. In some embodiments, the diagnostic check may include a display size test. For example, this may include determining a width of the screen to evaluate whether the pre-staged presentation will display properly on screens of various sizes, such as large desktop or wall screens as well as tablet computer screens and smartphone screens.

In some embodiments, the above-identified diagnostic checks may be performed using artificial intelligence or machine learning. As the checks are repeated over time, the detected parameters, the recommendation, and whether the user accepted the recommendation can be compiled in a database. Trends can be detected from the compiled information through analysis using machine learning or artificial intelligence. The result of the analysis impacts how embodiments recommend for future similar issues. For example, if embodiments recommend movement of the microphone closer to the user three times, and the user overrides it all three times, on the fourth time, the recommendation may not be made as the system server 102 will understand that location of the microphone to be proper. Instead, the system may then issue warnings when the microphone is closer to the user rather than farther away.

Figure 8:
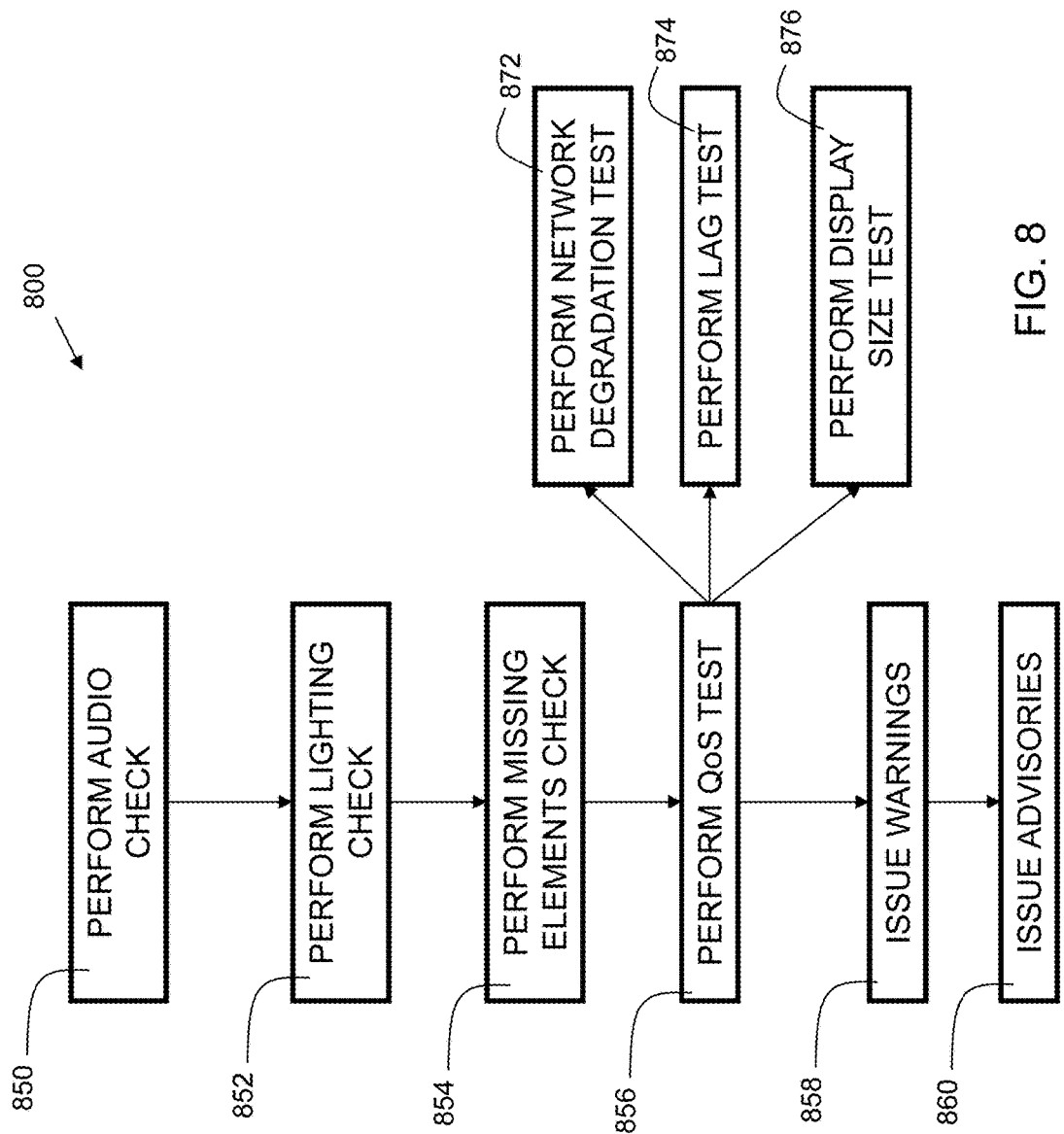
FIG. 8 is a flowchart indicating additional process steps for embodiments of the present invention.

FIG. 8 is a flowchart 800 indicating additional process steps for embodiments of the present invention. At 850, an audio check is performed. At 852, a lighting check is performed. At 854, a missing elements check is performed. At 856, a quality of service test is performed. In some cases, the result of the quality of service test will lead to one or more of performing a network degradation test at 872, performing a lag test at 874, and performing a display size test at 876. At 858, warnings, if any, are issued. At 860, advisories are issued.

Figure 9:
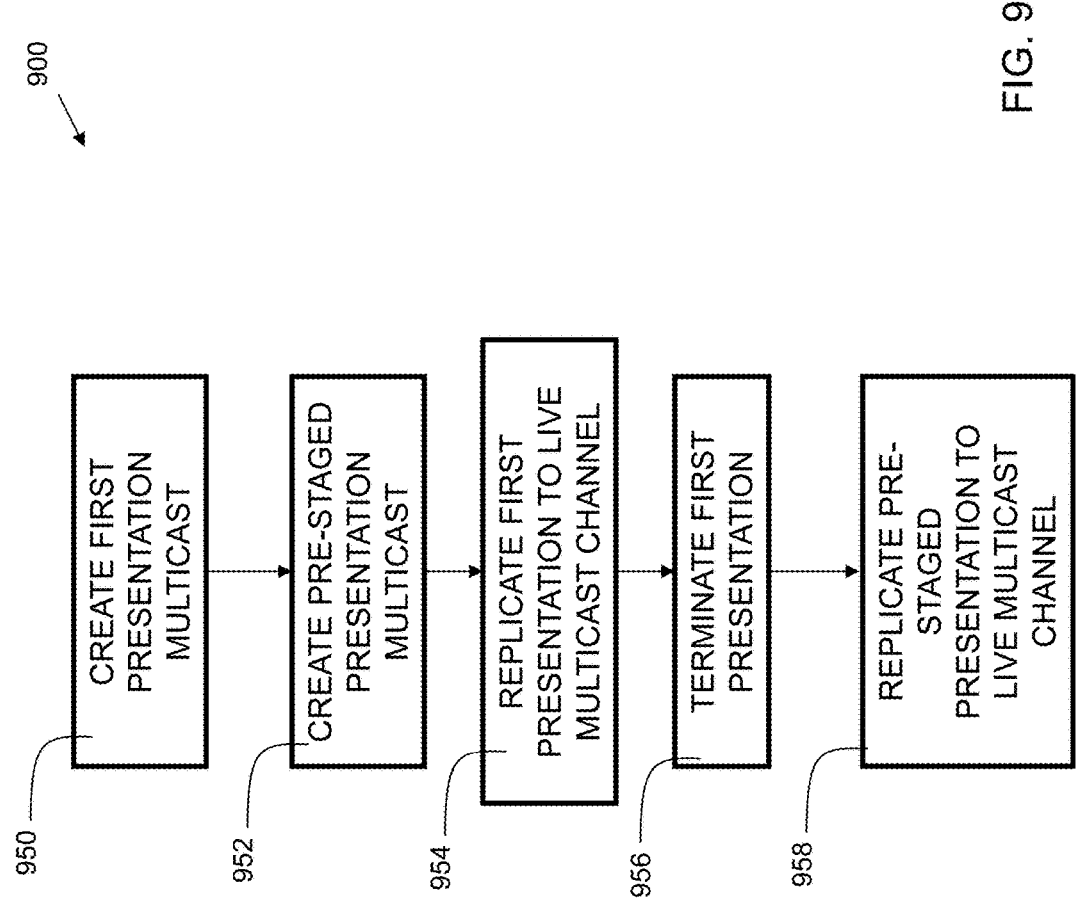
FIG. 9 is a flowchart indicating process steps for transitioning from a first presentation to a second presentation in accordance with embodiments of the present invention.
Figure 10:
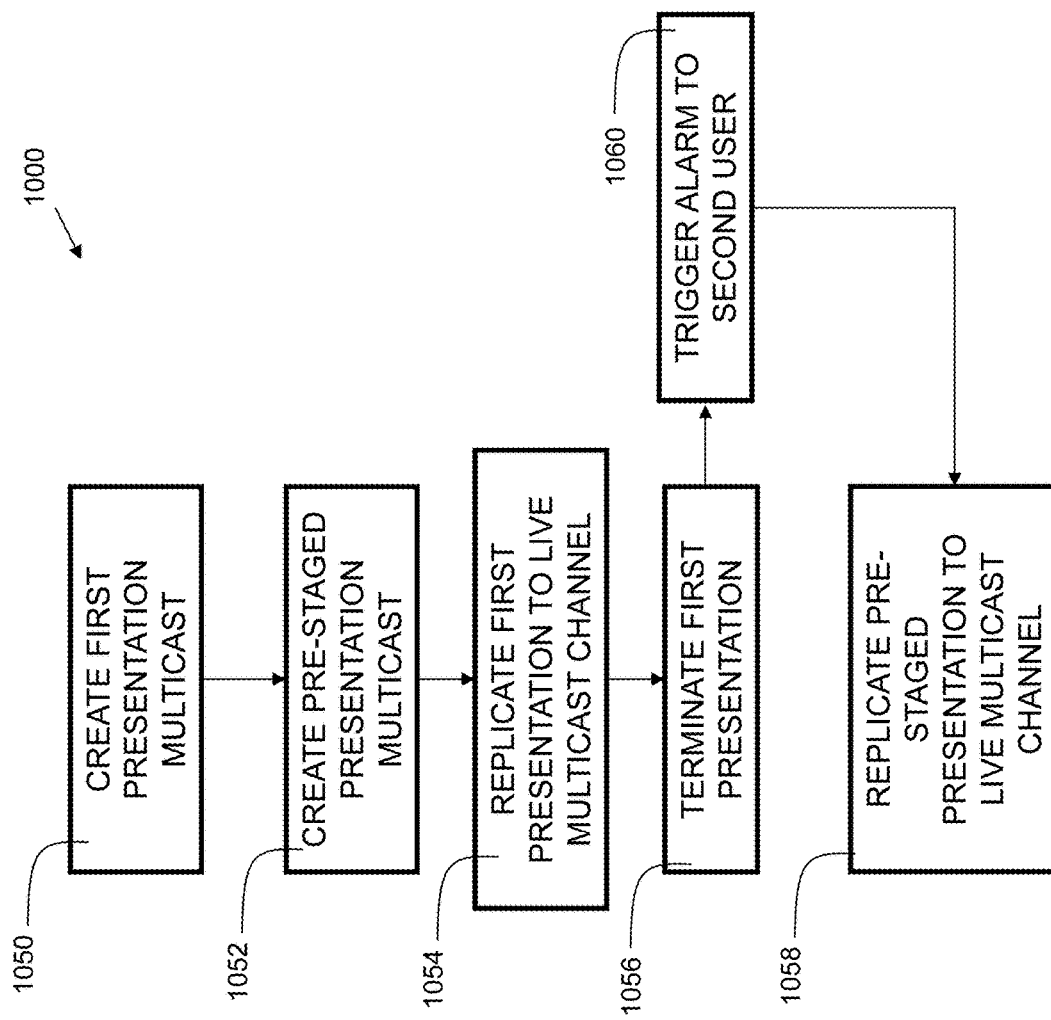
FIG. 10 is a flowchart indicating process steps for transitioning from a first presentation to a second presentation in accordance with additional embodiments of the present invention.

FIGS. 9 and 10 show flowchart 900 and flowchart 1000, respectively, each indicating process steps for transitioning from a first presentation to a second presentation in accordance with embodiments of the present invention. In embodiments, a first presentation is presented on a first multicast channel. The first multicast channel is replicated to a live multicast channel (or a live broadcast channel). A second presentation is pre-staged to a second multicast channel. The presenter of the second presentation joins the first multicast channel and the second multicast channel. Other (non-presenting participants) join the live multicast channel, and thus first are able to view the first presentation. When the first presentation ends, a web conferencing system server replicates the second multicast channel onto the live multicast channel. Then, the client devices are able to render the second presentation seamlessly, without a user needing to take any action on their client device.

Accordingly, at FIG. 9, at 950, a first presentation multicast is created. At 952, a pre-staged presentation multicast is created. At 954, a first presentation is replicated to the live multicast channel. At 956, the first presentation is terminated. In response to the first presentation's termination, the pre-staged presentation is replicated to the live multicast channel at 958.

In FIG. 10, at 1050, a first presentation multicast is created. At 1052, a pre-staged presentation multicast is created. At 1054, a first presentation is replicated to the live multicast channel. At 1056, the first presentation is terminated. In some embodiments, in response to the first presentation being terminated, an alarm is triggered at the client of the second user to signal to the second user to get ready to go live. In such embodiments, an alarm is triggered at 1060, followed by replication, at 1058, of the pre-staged presentation to the live multicast channel. In some embodiments, the alarm may be an audio signal, visual signal, or other mechanism.

It should be recognized that in some embodiments, the elements of the methods of FIGS. 7-10 may be performed in a different order. In some embodiments, some of the elements may be performed simultaneously or removed altogether. In some embodiments, additional steps may be performed before, after, or intervening between the listed steps, of the methods. Embodiments include all feasible steps and order thereof.

In some embodiments, the diagnostic tests are performed by system 102 (FIG. 1), and results (ok, error, warning, advisory, etc.) reported to the client device of the second user. System 102 streams the first presentation via the live multicast channel to the client device of the second user (as well as the clients of other viewers), provides the pre-staging "room", and eventually executed the transition and runs the second presentation on the live multicast channel.

As can now be appreciated, disclosed embodiments provide improved capabilities in web conferencing with multiple presenters. Disclosed embodiments enable seamless transitioning from a first presentation originating from a first client device to a second presentation originating from a second client device. Furthermore, the presentation originating from the second client device can be tested in an end-to-end manner, before going "live" and being presented to a larger audience. This gives the presenter an opportunity to check driver compatibility, lighting, audio, and other web conferencing elements prior to dissemination to the full group of meeting participants. In this way, efficiency in web conferencing can be achieved.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer implemented method for performing a web conferencing presentation pre-staging, comprising:
    transmitting a first presentation corresponding to a first participant in a live presentation mode as a web conference to a plurality of participants;
    transmitting, for display on an electronic display system associated with a second participant, the first presentation in the live presentation mode simultaneously with a second presentation, corresponding to the second participant, in a pre-staged presentation mode; and
    transitioning the second presentation to the live presentation mode upon termination of the first presentation.

2. The method of claim 1, further comprising performing a diagnostic check of the second presentation prior to transitioning the second presentation to the live presentation mode upon termination of the first presentation.

3. The method of claim 2, wherein the diagnostic check includes an audio check.

4. The method of claim 2, wherein the diagnostic check includes a lighting check.

5. The method of claim 2, wherein the diagnostic check includes a missing elements check.

6. The method of claim 1, further comprising:
    creating a plurality of virtual machines; and
    rendering the second presentation in the pre-staged presentation mode on each of the virtual machines.

7. The method of claim 1, further comprising performing a Quality-of-Service (QoS) test on the second presentation prior to transitioning the second presentation to the live presentation mode upon termination of the first presentation.

8. An electronic communication device comprising:
    a processor;
    a memory coupled to the processor, the memory containing instructions, that when executed by the processor, perform the steps of:
        transmitting a first presentation corresponding to a first participant in a live presentation mode as a web conference to a plurality of participants;

transmitting, for display on an electronic display system associated with a second participant, the first presentation in the live presentation mode simultaneously with a second presentation, corresponding to the second participant, in a pre-staged presentation mode; and transitioning the second presentation to the live presentation mode upon termination of the first presentation.

9. The device of claim 8, wherein the memory further comprises instructions, that when executed by the processor, perform the step of performing a diagnostic check of the second presentation prior to transitioning the second presentation to the live presentation mode upon termination of the first presentation.

10. The device of claim 9, wherein the memory further comprises instructions, that when executed by the processor, perform the step of performing an audio check.

11. The device of claim 9, wherein the memory further comprises instructions, that when executed by the processor, perform the step of performing a lighting check.

12. The device of claim 9, wherein the memory further comprises instructions, that when executed by the processor, perform the step of performing a missing elements check.

13. The device of claim 9, wherein the memory further comprises instructions, that when executed by the processor, perform the steps of:
    creating a plurality of virtual machines; and
    rendering the second presentation in the pre-staged presentation mode on each of the virtual machines.

14. The device of claim 9, wherein the memory further comprises instructions, that when executed by the processor, perform the step of performing a Quality-of-Service (QoS) test on the second presentation prior to transitioning the second presentation to the live presentation mode upon termination of the first presentation.

15. A computer program product for performing a web conferencing presentation pre-staging on an electronic computing device, the computer program product comprising a computer readable hardware storage device including program instructions embodied therewith, the program instructions executable by a processor to cause the electronic computing device to:

transmit a first presentation corresponding to a first participant in a live presentation mode as a web conference to a plurality of participants;

transmit, for display on an electronic display system associated with a second participant, the first presentation in the live presentation mode simultaneously with a second presentation, corresponding to the second participant, in a pre-staged presentation mode; and transition the second presentation to the live presentation mode upon termination of the first presentation.

16. The computer program product of claim 15, wherein the computer readable hardware storage device further includes program instructions executable by the processor to cause the electronic computing device to perform a diagnostic check of the second presentation prior to transitioning the second presentation to the live presentation mode upon termination of the first presentation.

17. The computer program product of claim 16, wherein the computer readable hardware storage device further includes program instructions executable by the processor to cause the electronic computing device to perform an audio check.

18. The computer program product of claim 16, wherein the computer readable hardware storage device further includes program instructions executable by the processor to cause the electronic computing device to perform a lighting check.

19. The computer program product of claim 15, wherein the computer readable hardware storage device further includes program instructions executable by the processor to cause the electronic computing device to:
    create a plurality of virtual machines; and
    render the second presentation in the pre-staged presentation mode on each of the virtual machines.

20. The computer program product of claim 15, wherein the computer readable hardware storage device further includes program instructions executable by the processor to cause the electronic computing device to perform a Quality-of-Service (QoS) test on the second presentation prior to transitioning the second presentation to the live presentation mode upon termination of the first presentation.

* * * * *